US012272196B2

(12) United States Patent
Rafferty et al.

(10) Patent No.: US 12,272,196 B2
(45) Date of Patent: *Apr. 8, 2025

(54) SYSTEMS AND METHODS FOR PROVIDING A SECURE PHYSICAL STORAGE SYSTEM

(71) Applicant: Capital One Services, LLC, McLean, VA (US)

(72) Inventors: Galen Rafferty, Mahomet, IL (US); Jeremy Edward Goodsitt, Champaign, IL (US); Austin Walters, Columbia, TN (US); Christopher Wallace, Frisco, TX (US); Brian Barr, Schenectady, NY (US); Grant Eden, San Francisco, CA (US); Samuel Sharpe, Cambridge, MA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/416,988

(22) Filed: Jan. 19, 2024

(65) Prior Publication Data
US 2024/0153327 A1 May 9, 2024

Related U.S. Application Data

(63) Continuation of application No. 17/750,208, filed on May 20, 2022, now Pat. No. 11,922,745.

(51) Int. Cl.
G07C 9/00 (2020.01)
G06F 21/70 (2013.01)
H04L 9/40 (2022.01)

(52) U.S. Cl.
CPC ........ *G07C 9/00563* (2013.01); *H04L 63/083* (2013.01)

(58) Field of Classification Search
CPC .............. H04L 63/083; G07C 9/00563; G07C 9/00912; G07C 9/00896; G07C 9/00309;
(Continued)

(56) References Cited

U.S. PATENT DOCUMENTS 11,295,569 B2 * 4/2022 Phillips .............. G07C 9/00912
11,922,745 B2 * 3/2024 Rafferty ............. G07C 9/00563
(Continued)

*Primary Examiner* — Dionne Pendleton
(74) *Attorney, Agent, or Firm* — TROUTMAN PEPPER LOCKE LLP; Christopher J. Forstner; John A. Morrissett

(57) ABSTRACT

Disclosed embodiments include systems and methods for providing a secure physical storage system. The system may receive a request to register a first physical storage box from an entity including location information and security information. The request can be validated by comparing the security information to a predetermined security threshold. The location information associated with the first physical storage box can be recorded to a blockchain. The first registration information can be received from a first user device. The first physical storage box can be assigned to the first user device and a first identity token associated with the first physical storage box. The assignment information associated with the first physical storage box can be recorded to the blockchain. A first identity token can be received from the first user device. Instructions can be transmitted to the first physical storage box to transition from a locked to an unlocked state.

20 Claims, 3 Drawing Sheets

(58) Field of Classification Search
CPC ...... G07C 9/00571; G07C 2009/00388; G07C 2009/00865; G07C 2009/0092; G07C 9/00182; G07C 9/00944; G07C 9/22; B65G 61/00; G07F 17/12; G07F 17/13
See application file for complete search history.

(56) References Cited

U.S. PATENT DOCUMENTS

| | | |
|---|---|---|
| 2011/0042928 A1 | 2/2011 | Huisman et al. |
| 2016/0133074 A1 | 5/2016 | Amdahl |
| 2020/0005388 A1 | 1/2020 | Lim et al. |
| 2022/0028194 A1* | 1/2022 | Grzenda ............ G07C 9/00571 |

* cited by examiner

SYSTEMS AND METHODS FOR PROVIDING A SECURE PHYSICAL STORAGE SYSTEM

CROSS-REFERENCE TO RELATED APPLICATIONS

This application is a continuation of, and claims priority under 35 U.S.C. § 120 to, U.S. patent application Ser. No. 17/750,208, filed May 20, 2022, the entire contents of which are fully incorporated herein by reference.

FIELD

The disclosed technology relates to systems and methods for providing a secure physical storage system. Specifically, this disclosed technology relates to providing physical storage boxes that can be assigned to users with enhanced security options, and the option for moving a physical storage box from one location to another.

BACKGROUND

Traditional systems and methods for providing a secure physical storage system typically require a customer or user to register with a financial service provider, such as a banking institution, to receive access to a safety deposit box. Valuables can be stored at a safety deposit box, and the customer can access the contents of the safety deposit box by traveling to the location of the banking institution and proving their identity. However, safety deposit boxes are only available at select banking institutions, and cannot be transported from one location to another. Additionally, customers cannot conveniently provide remote access to others without being physically present at the location of the safety deposit box. There is a need for increased flexibility in providing secure physical storage systems that are available in a multitude of locations, and allow for customers to request transportation of physical storage boxes from one location to another.

Accordingly, there is a need for improved systems and methods for providing a secure physical storage system. Embodiments of the present disclosure are directed to this and other considerations.

SUMMARY

Disclosed embodiments may include a system for providing a secure physical storage system. The system may include one or more processors, and memory in communication with the one or more processors and storing instructions that, when executed by the one or more processors, are configured to cause the system to provide a secure physical storage system. The system may receive first registration information from a first user device. The system may assign a first physical storage box of a plurality of physical storage boxes to the first user device and assign a first identity token to the first user device that is associated with the first physical storage box. The system can record assignment information associated with the first physical storage box and the first identity token to a blockchain implemented by the one or more processors. The system can receive the first identity token from the first user device. The system can transmit instructions to the first physical storage box to transition from a locked state to an unlocked state in response to receiving the first identity token from the first user device.

Disclosed embodiments may include a system for providing a secure physical storage system. The system may include one or more processors, and memory in communication with the one or more processors and storing instructions that, when executed by the one or more processors, are configured to cause the system to provide a secure physical storage system. The system may receive a request to register a first physical storage box from an entity. The request can include location information and security information. The system can validate the request by comparing the security information to a predetermined security threshold. The system can record the location information associated with the first physical storage box to a blockchain. The system can receive first registration information from a first user device. The system can assign the first physical storage box to the first user device and a first identity token associated with the first physical storage box. The system can record assignment information associated with the first physical storage box and the first identity token to the blockchain. The system can receive the first identity token from the first user device. The system can transmit instructions to the first physical storage box to transition from a locked state to an unlocked state in response to receiving the first identity token from the first user device.

Disclosed embodiments may include a method for providing a secure physical storage system. The method can include receiving first registration information from a first user device. The method can include registering the first user device to have access to a first physical storage box based on the first registration information. The method can include assigning a first identity token to the first user device. The method can include recording the registration of the first physical storage box to a first user device and the first identity token to a blockchain. The method can include receiving the first identity token from the first user device. The method can include transmitting instructions to the first physical storage box to transition from a locked state to an unlocked state in response to receiving the first identity token from the first user device.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Figure 1:
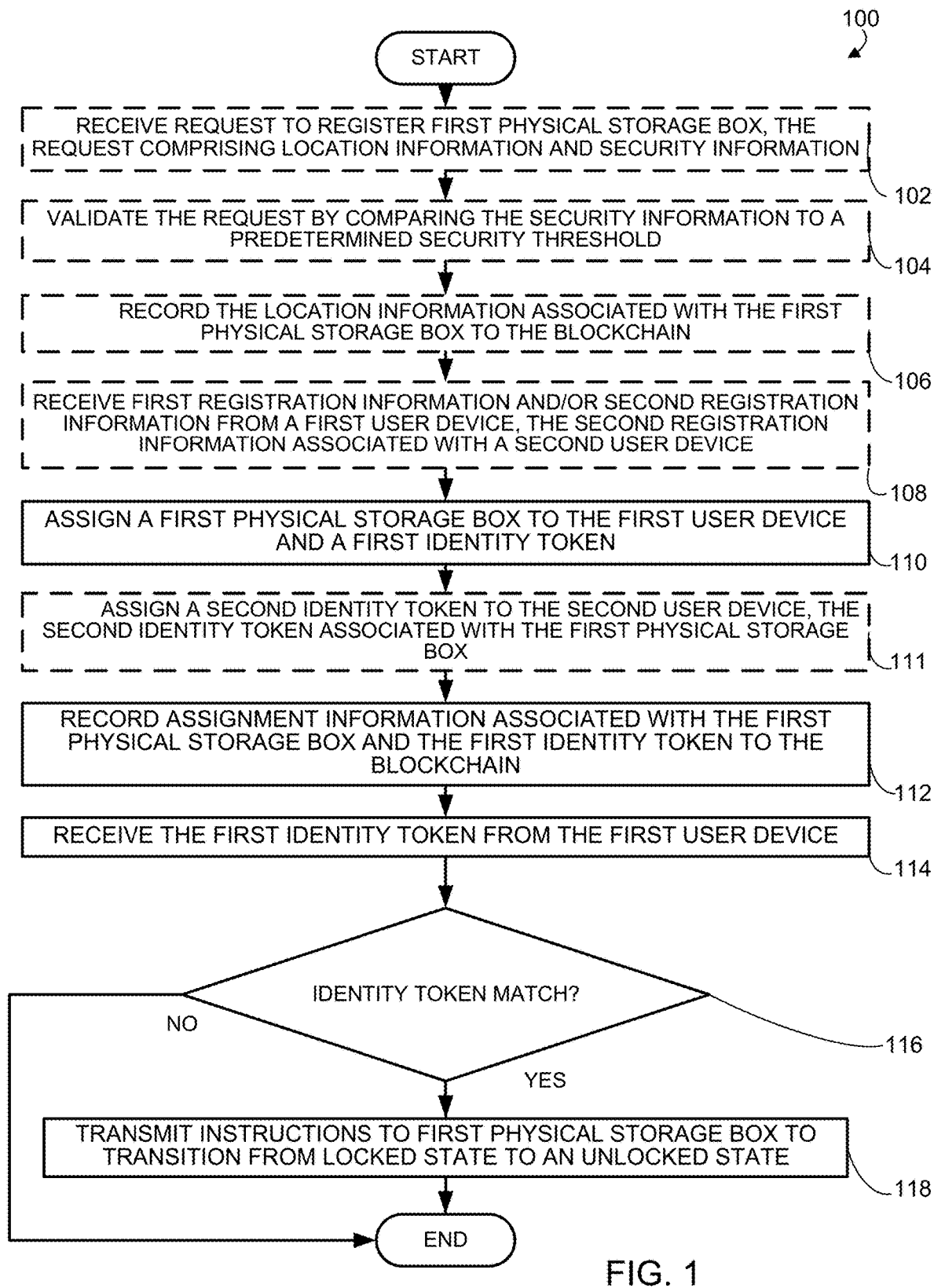
FIG. 1 is a flow diagram illustrating an exemplary method for providing a secure physical storage system in accordance with certain embodiments of the disclosed technology.

Examples of the present disclosure related to systems and methods for providing a secure physical storage system. More particularly, the disclosed technology relates to provisioning a business entity to operate a distributed node that provides users access to a secure physical storage box. A user can be assigned a physical storage box, which can be securely accessed by the user. Each node of the distributed node can be configured to record assignment information onto a decentralized permissioned blockchain, so that ownership information of each physical storage box is recorded without a single point of failure. Nodes can also be configured to receive registration requests for new nodes associated with business entities that wish to participate in the secure physical storage system. Additionally, users can adjust their desired level of security for access to their physical storage box, for example limiting the number of unlocks of the physical storage box over a period of time, requiring multiple keys to unlock their physical storage box, and/or providing the option of a remote unlock feature. Additionally, the user can request the physical storage box to be transported from a first location to a second location, and this information is recorded to the blockchain by a respective node to keep track of location information of each physical storage box without a single point of failure. The systems and methods described herein improve, in some instances, the operation of computers and technology. The present disclosure details a decentralized physical storage system that allows a user to dynamically set security settings for their physical storage box, and allow for the autonomous transport or delivery of their physical storage box to various locations for ease of access. The nodes of the secure physical storage system record assignment information, security settings, and location information for each physical storage box of the secure physical storage system without a single point of failure. This, in some examples, may involve using a node of secure physical storage system to dynamically manage location and unlock settings for each physical storage box of the secure physical storage system, and record such information to a decentralized blockchain, which improves the security and ease of use over traditional physical storage systems. Using a computer system configured in this way may allow the system to provide for secure physical storage boxes that can be transported from one location to another while retaining a high level of security. This is a clear advantage and improvement over prior secure storage systems that require a user to open a bank account to gain access to a safety deposit box because safety deposit boxes cannot be physical transported, and do not provide for improved security settings such as allowing for remote unlocks and/or requiring multiple security keys for access. The present disclosure solves this problem by addressing these limitations of traditional safety deposit boxes. Furthermore, examples of the present disclosure may also improve the security with which computers can store assignment information, security settings, and location information for physical storage devices by recording such information to a decentralized permissioned blockchain. Overall, the systems and methods disclosed have significant practical applications in the secure physical storage devices field because of the noteworthy improvements over traditional safety deposit box systems.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a flow diagram illustrating an exemplary method 100 for providing a secure physical storage system, in accordance with certain embodiments of the disclosed technology. The steps of method 100 may be performed by one or more components of the system 300 (e.g., node 220A, 220B, . . . , 220N, or a respective physical storage box 310A, 310B, . . . , 310N of physical storage box array 308 or user device 302A, 302B, 302C), as described in more detail with respect to FIGS. 2 and 3.

In optional block 102, a node 220 (e.g., any one of an existing node 220A, 220B, . . . , 220N) may receive a request to register a first physical storage box (e.g., physical storage box 310A) from an entity. In some examples, each node 220A, 220B, . . . 220N is operated by a respective business entity, and the request to register the first physical storage box 310A is received by the node 220 (e.g., node 220A) that is associated with the respective business entity. The request may include location information and security information. The location information can include a physical address at which the first physical storage box 310A is located. The security information can include a business entity name, and security characteristics such as, whether the physical storage box 310 is guarded by physical security, whether the physical storage box 310 is monitored by security systems, whether the physical storage box 310 is placed indoors or outdoors, the level of protection of the facility in which the physical storage box 310 is placed, etc. In examples, the security characteristics can include a profile for each individual that has access to physical storage box 310 (e.g., is this box accessible by only authenticated and authorized users, is it accessible by only employees of an organization, and/or is physical storage box 310 located in a publicly accessible area open to the general public). In some examples, the security characteristics can include metrics such as the number of recorded security incidents at that location (e.g., a number of times that a physical storage box 310 has been accessed without permission). In some examples, the security characteristics can include metrics associated with how long a respective physical storage box 310 (e.g., physical storage box 310A, etc.) remains assigned to a particular user. In some examples, the security characteristics can include metrics associated with a number of times a respective physical storage box 310 is accessed per unit of time (e.g., per hour, per day, per week, per month, per year, etc.) In some examples, the security characteristics can include metrics for how often a respective physical storage box 310 is relocated per unit of time. According to some examples, the business can be a financial service provider, such as a bank, that offers safety deposit boxes to customers and existing safety deposit boxes can be registered as a physical storage box 310 if the security requirements are met.

In optional block 104, the node 220 may validate the request by comparing the security information to a predetermined security threshold. In some examples, the predetermined security threshold may include a plurality of thresholds associated with a plurality of security levels. For example, a first threshold may be associated with the lowest level of security. The lowest level of security threshold may be appropriate for physical storage boxes that are placed in publicly accessible areas without any physical security or monitoring. For example, a physical storage box that is placed outside in a city center may qualify for the lowest security threshold if the physical storage box itself is constructed to be resistant to tampering, similar to the construction of an automated teller machine. In some examples, a second predetermined security threshold may be associated with a second level of security. The second level of security may be appropriate for physical storage boxes that are placed indoors within a business entity, but does not offer enhanced security, such as security system monitoring and/or physical security. In some examples, a third predetermined security threshold may be associated with a third level of security. The third level of security may be appropriate for physical storage boxes that are placed indoors within a business entity having a high level of security. For example, a business entity such as a bank that offers security deposit boxes may qualify for the third security level. Other business entities may qualify for the third security level if the other business entities offer security similar to that of a bank that offers security deposit boxes. In some examples, the predetermined security threshold may be a single threshold. When the security information exceeds the predetermined security threshold, the system may include the first physical storage box 310A within the secure physical storage system.

In optional block 106, the node 220 (e.g., node 220A) may record the location information associated with the first physical storage box 310A to the blockchain. The location information associated with the first physical storage box 310A is then stored in a distributed matter across all nodes within the system 300 (e.g., stored on each node 220A of system 300).

In block 108, the node 220 (e.g., node 220A) may receive first registration information and/or second registration information from a first user device 302A. The second registration information is associated with a second user device 302B. Registration information may include know your customer (KYC) information such as a user's name, address, date of birth, social security number, and the like. In some examples, the registration information may include a photo or scan of an identifying document of a user, such as a driver's license, passport, birth certificate, or the like. The registration information may also include a request for a particular physical storage box to be assigned to the user. For example, the first registration information may include a request for the first physical storage box 310 to be registered to the first user.

In block 110, the node 220 (e.g., node 220A) can assign a first physical storage box (e.g., physical storage box 310A) to the first user device. Assigning a first physical storage box can include the node 220A recording assignment information to the permissioned decentralized blockchain. Accordingly, the assignment information is broadcast to the other nodes 220 within the system (e.g., node 220B, 220C, . . . 220N). Assigning a first physical storage box can include assigning a first identity token to the first user that is associated with the first physical storage box 310A. Identity tokens are unique to each user within system 300, and can be used to uniquely identify the first user as the assigned owner of a respective physical storage box 310. Assigning the first identity token can include transmitting the first identity token to the first user device 302A. In block 111, the system may assign a second identity token to the second user device 302B. The second identity token associated with the first physical storage box.

In some examples the identity token can be an access token or an access code assigned to a respective user within system 300. In some examples, the identity token can be a physical device storing a unique access code, such as a near-field communication device. In some example, the identity token can be uniquely generated code associated with a respective user within system 300. A new security code can be generated periodically and transmitted to a user device associated with the user. A user can use the generated security code to access the physical storage device 310. In some example, the access code can be transmitted to a user device associated with the user in response to the user scanning a QR code associated with their assigned physical storage box 310.

In block 112, the node 220 (e.g., node 220A) may record the assignment information associated with the first physical storage box 310A and the first identity token to the blockchain. Recording the assignment information and the first identity token may include broadcasting the assignment information and the first identity token to other nodes 220 within system 300 (e.g., node 220B, 220C, . . . 220N). In some examples, in place of storing the first identity token on the blockchain, a hashed value based on the first identity token is stored on the blockchain for increased security of system 300.

In block 114, the node 220 (e.g., node 220A) may include receiving the first identity token from the first user device 302A. For example, the first identity token may be transmitted from the first user device 302A through an encrypted wireless transmission (e.g., via network 306). In some examples, the first identity token can be received by the first physical storage box 310A, and first physical storage box 310A can then transmit the first identity token to the first node 220A. The first physical storage box 310A can include a wireless reader, such as near field communication (NFC) reader that can interact with the first user device 302A to receive the first identity token. Subsequently, the first identity token can be transmitted to the first node 220A in order for the first identity token to be verified.

In decision block 116, the node 220 (e.g., node 220A) may determine whether the first identity token received from the user device 302A matches the stored first identity token on the blockchain. In some examples, when the first identity is not directly stored on the blockchain, the node 220A can create a hash of the first identity token received from the first user device 302A and compare the hash to the hash stored on the blockchain. When the first identity token does not match the stored first identity token the method may end. In response to the first identity token matching the stored first identity token, the method may move to block 118.

In block 118, the node 220 (e.g., node 220A) may transmit instructions to the first physical storage box 310A to transition from a locked state to an unlocked state.

In some examples, a user may wish to have his or her physical storage box 310 transported from a first location to a second location. For example, the user may plan to go on a business trip and wish to have one or more belongings from the physical storage box be transported to a location near his travel destination for convenience. A user device 302 associated with the user can transmit a request to a node 220 to transfer a physical storage box 310 associated with the user from a first location to a second location. The node 220 may determine the security level associated with the physical storage box 310 at the first location and determine the security level associated with the second location. If the second location meets or exceeds the security level associated with the first location, the transfer request can be recorded to the blockchain by the node 220 and the physical storage box 310 can be transported to the second location in a secure manner. If the second location does not meet or exceed the security level associated with the first location, the user may receive a notification on the user device informing the user that the security level of the second location is less than that of the first location. If the user nonetheless wishes to effectuate the transfer, the user can input instructions on the user device 302 to have the physical storage box transported to the second location. Upon arrival at the second location, the location information can be recorded to the blockchain by the node 220.

In some examples, a user may wish to place access restrictions on a physical storage box 310. Accordingly, the user may use user device 302 to transmit access restrictions to a respective node 220. The node 220 may record the access restrictions to the blockchain. The access restrictions can be of any type. For example, the user may wish to limit access to physical storage box to a particular time of the day (e.g., 2 μm to 4 pm only) or a number of unlocks per day (e.g., a maximum of one unlock per day). In some examples, the access restriction can be requiring a second user to provide a second identity token within a predetermined timeframe to the first identity token being provided to a respective node. For example, a first user device 302A and a second user device 302B can both be associated with a first physical storage device 310A. In order for first physical storage device 310A, the first user device 302A may provide a first identity token to the first node 220A and/or physical storage device 310A. Following receipt of the first identity token from the first user device 302A, the second user device 302B may be required to provide the second identity token to the first node 220A and/or the physical storage device 310A within a predetermined time period. If the second identity token is received within the predetermined time period, the physical storage device 310A may transition from a locked state to an unlocked state. In some examples, the predetermined time period can be set by the first user to any period of time, for example, 60 seconds, 5 minutes, one hour, etc.

In some examples, a user that has an assigned physical storage box may wish to provide another user with temporary access to the physical storage box. For example, the first user may wish to provide access to a third user to the first physical storage box 310A. Accordingly, the first user device may provide node 220 (e.g., node 220A) with third registration information that is associated with a third user device. The third registration information may be a phone number, an email address, a mobile device IMEI number, a mobile device MEID number, etc. Based on the provided registration information, the node 220A can provide a one-time key to the third user device. The one time key can be then recorded to the blockchain by node 220A. The third user can then unlock the first physical storage box 310A by providing the one-time key to the first physical storage box 310A and/or node 220A. In response to receiving the one-time key, the first physical storage box may transition from a locked state to an unlocked state. In examples where the node 220A receives the one-time key, the node 220A may transmit instructions to the first physical storage box 310A to transition from a locked state to an unlocked state.

In some examples, a user may wish to remotely unlock a physical storage box 310. For example, the first user of first physical storage box 310A may want to give access to another party to the contents of the first physical storage box 310A without assigning a one-time key. Accordingly, the first user device 302A can remotely transmit the first identity token to the node 220A over network 306 and in response, the node 220A can provide instructions to the first physical storage box 310A to transition from a locked state to an unlocked state.

Although the above examples are described in reference to a first user and a first physical storage box 310A assigned to the first user, it should be understood that the same features are available to any user and any storage box 310 assigned to a respective user within system 300.

Figure 2:
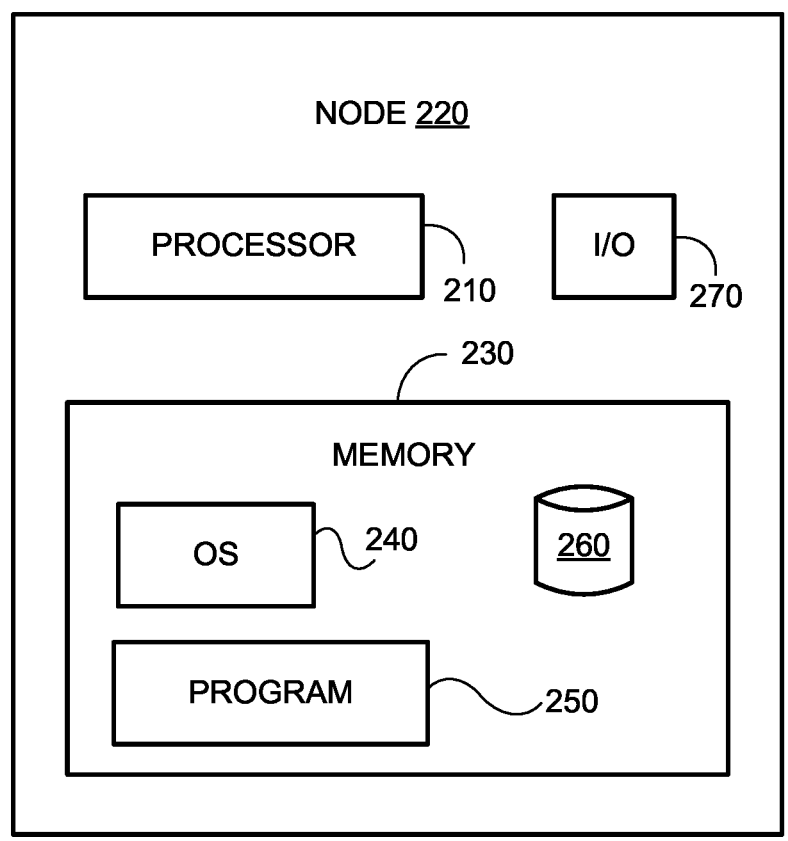
FIG. 2 is block diagram of an example node used to provide a secure physical storage system, according to an example implementation of the disclosed technology.
Figure 3:
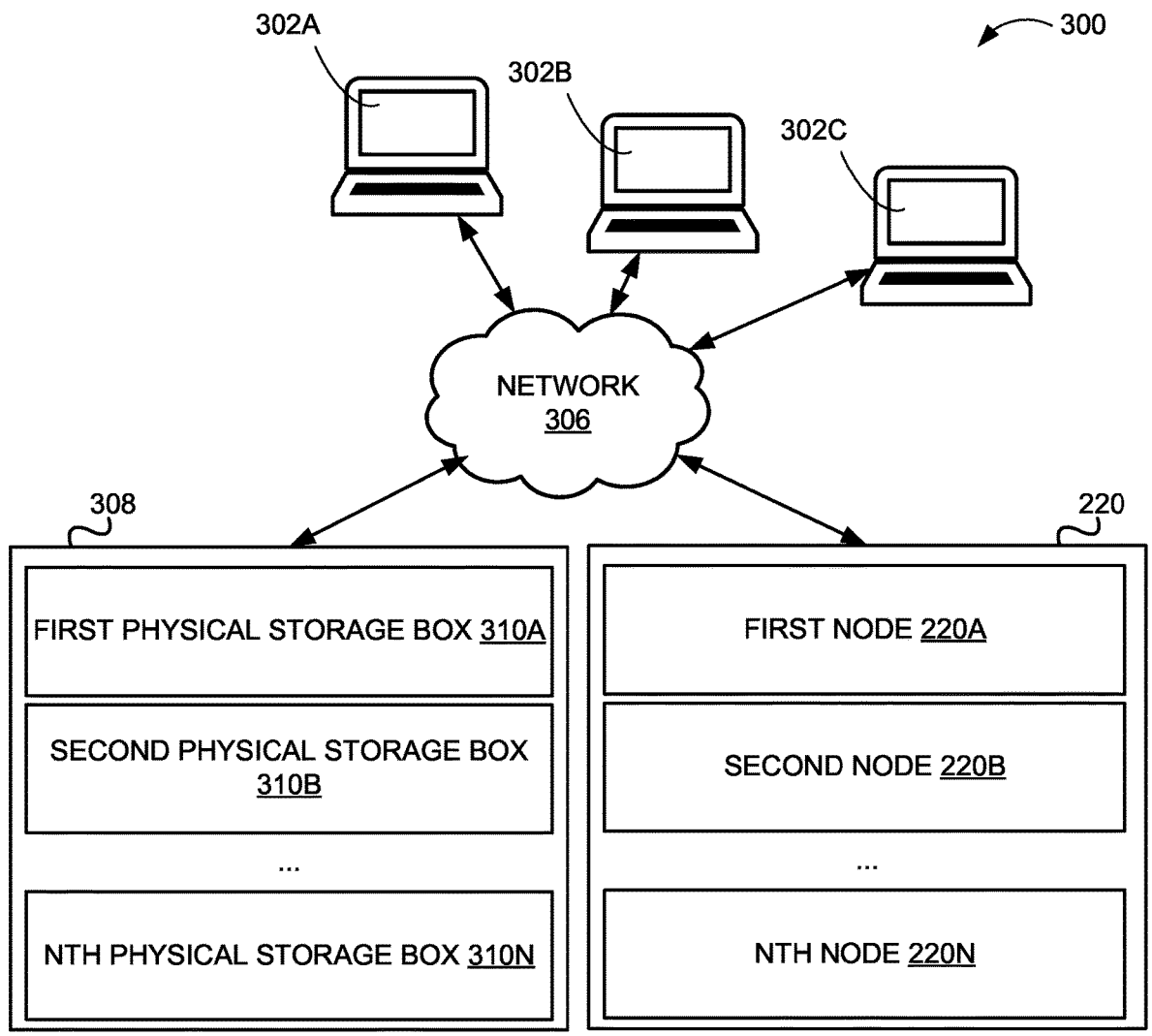
FIG. 3 is block diagram of an example system that may be used to provide a secure physical storage system, according to an example implementation of the disclosed technology.

FIG. 2 is a block diagram of an example node 220 used to manage assignment and location information for the secure physical storage system 300, according to an example implementation of the disclosed technology. According to some embodiments, the user devices 302A, 302B, 302C, and physical storage boxes 310, as depicted in FIG. 3 and described below, may have a similar structure and components that are similar to those described with respect to node 220 shown in FIG. 2. As shown, the node 220 may include a processor 210, an input/output (I/O) device 270, a memory 230 containing an operating system (OS) 240 and a program 250. In certain example implementations, the node 220 may be a single server or may be configured as a distributed computer system including multiple servers or computers that interoperate to perform one or more of the processes and functionalities associated with the disclosed embodiments. In some embodiments node 220 may be one or more servers from a serverless or scaling server system. In some embodiments, the node 220 may further include a peripheral interface, a transceiver, a mobile network interface in communication with the processor 210, a bus configured to facilitate communication between the various components of the node 220, and a power source configured to power one or more components of the node 220.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 230.

The processor 210 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 210 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 210 may be a single core processor that is configured with virtual processing technologies. In certain embodiments, the processor 210 may use logical processors to simultaneously execute and control multiple processes. The processor 210 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the node 220 may include one or more storage devices configured to store information used by the processor 210 (or other components) to perform certain functions related to the disclosed embodiments. In one example, the node 220 may include the memory 230 that includes instructions to enable the processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The node 220 may include a memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the node 220 may include the memory 230 that may include one or more programs 250 to perform one or more functions of the disclosed embodiments. For example, in some embodiments, the node 220 may additionally manage dialogue and/or other interactions with the customer via a program 250.

The processor 210 may execute one or more programs 250 located remotely from the node 220. For example, the node 220 may access one or more remote programs that, when executed, perform functions related to disclosed embodiments.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 230 may include software components that, when executed by the processor 210, perform one or more processes consistent with the disclosed embodiments. In some embodiments, the memory 230 may include a node database 260 for storing related data to enable the node 220 to perform one or more of the processes and functionalities associated with the disclosed embodiments.

The node database 260 may include stored data relating to status data (e.g., average session duration data, location data, idle time between sessions, and/or average idle time between sessions) and historical status data. Node database 260 can also store information such as location data, assignment data, and identity tokens related to the physical storage boxes 310.

The node 220 may also be communicatively connected to one or more memory devices (e.g., databases) locally or through a network. The remote memory devices may be configured to store information and may be accessed and/or managed by the node 220. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The node 220 may also include one or more I/O devices 270 that may comprise one or more interfaces for receiving signals or input from devices and providing signals or output to one or more devices that allow data to be received and/or transmitted by the node 220. For example, the node 220 may include interface components, which may provide interfaces to one or more input devices, such as one or more keyboards, mouse devices, touch screens, track pads, trackballs, scroll wheels, digital cameras, microphones, sensors, and the like, that enable the node 220 to receive data from a user (such as, for example, via the user device 302).

In examples of the disclosed technology, the node 220 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the node 220 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the node 220 may include a greater or lesser number of components than those illustrated.

FIG. 3 is a block diagram of an example system that may be used to interact with physical storage box array 308, according to an example implementation of the disclosed technology. The components and arrangements shown in FIG. 3 are not intended to limit the disclosed embodiments as the components used to implement the disclosed processes and features may vary. As shown, physical storage box array 308 may interact with a user device(s) 302A, 302B, and 302C via a network 306. The physical storage box array 308 can also interact with nodes 220 (e.g., node 220A, 220B, ... 220N). Physical storage box array 308 can include any number physical storage boxes 310 (e.g., first physical storage box 310A, second physical storage box 310B, ... Nth physical storage box 310N) that are operated by any number of nodes 220.

In some embodiments, a user may operate a user device 302 (e.g., first user device 302A, 302B, 302C, etc.) It should be understood that although only three user devices are shown, any number of user devices can be included in system 300. The user device 302 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 306 and ultimately communicating with one or more components of the physical storage box array 308. In some embodiments, the user device 302 may include or incorporate electronic communication devices for hearing or vision impaired users.

Users may include individuals such as, for example, subscribers, clients, prospective clients, or customers of an entity associated with an organization, such as individuals who have obtained, will obtain, or may obtain a product, service, or consultation from or conduct a transaction in relation to an entity associated with a respective node 220 (e.g., node 220A, 220B, ... 220N, etc.) of the one or more nodes. According to some embodiments, the user device 302 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The network 306 may be of any suitable type, including individual connections via the internet such as cellular or WiFi networks. In some embodiments, the network 306 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 306 may include any type of computer networking arrangement used to exchange data. For example, the network 306 may be the Internet, a private data network, virtual private network (VPN) using a public network, and/or other suitable connection(s) that enable(s) components in the system 300 environment to send and receive information between the components of the system 300. The network 306 may also include a PSTN and/or a wireless network.

The physical storage box array 308 may be associated with and optionally controlled by one or more entities such as a business, corporation, individual, partnership, or any other entity that provides one or more of goods, services, and consultations to individuals such as customers. In some embodiments, the physical storage box array 308 may be controlled by a third party on behalf of another business, corporation, individual, partnership. The physical storage box array 308 may include one or more servers and computer systems for performing one or more functions associated with products and/or services that the organization provides.

Web server 310 may include a computer system configured to generate and provide one or more websites accessible to customers, as well as any other individuals involved in access system 308's normal operations. Web server 310 may include a computer system configured to receive communications from user device 302 via for example, a mobile application, a chat program, an instant messaging program, a voice-to-text program, an SMS message, email, or any other type or format of written or electronic communication. Web server 310 may have one or more processors 322 and one or more web server databases 324, which may be any suitable repository of website data. Information stored in web server 310 may be accessed (e.g., retrieved, updated, and added to) via local network 312 and/or network 306 by one or more devices or systems of system 300. In some embodiments, web server 310 may host websites or applications that may be accessed by the user device 302. For example, web server 310 may host a financial service provider website that a user device may access by providing an attempted login that are authenticated by the node 220. According to some embodiments, web server 310 may include software tools, similar to those described with respect to user device 302 above, that may allow web server 310 to obtain network identification data from user device 302. The web server may also be hosted by an online provider of website hosting, networking, cloud, or backup services, such as Microsoft Azure™ or Amazon Web Services™.

The local network 312 may include any type of computer networking arrangement used to exchange data in a localized area, such as WiFi, Bluetooth™, Ethernet, and other suitable network connections that enable components of the physical storage box array 308 to interact with one another and to connect to the network 306 for interacting with components in the system 300 environment. In some embodiments, the local network 312 may include an interface for communicating with or linking to the network 306. In other embodiments, certain components of the physical storage box array 308 may communicate via the network 306, without a separate local network 306.

The physical storage box array 308 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 302 may be able to access physical storage box array 308 using the cloud computing environment. User device 302 may be able to access physical storage box array 308 using specialized software. The cloud computing environment may eliminate the need to install specialized software on user device 302.

In accordance with certain example implementations of the disclosed technology, the physical storage box array 308 may include one or more computer systems configured to compile data from a plurality of sources the node 220, web server 310, and/or the database 316. The node 220 may correlate compiled data, analyze the compiled data, arrange the compiled data, generate derived data based on the compiled data, and store the compiled and derived data in a database such as the database 316. According to some embodiments, the database 316 may be a database associated with an organization and/or a related entity that stores a variety of information relating to customers, transactions, ATM, and business operations. The database 316 may also serve as a back-up storage device and may contain data and information that is also stored on, for example, database 260, as discussed with reference to FIG. 2.

Example Use Case

The following example use case describes an example of a typical user flow pattern. This section is intended solely for explanatory purposes and not in limitation.

Jonas has recently registered his user device to receive access to a physical storage device within system 300. Jonas uses the physical storage box to store important work documents. However, Jonas has a work-related upcoming business trip to New York City and wishes to securely transfer the work documents to a close-by location. Jonas uses his registered user device to initiate a transfer of his physical storage box from his home-city to New York City. The location transfer request is recorded to the blockchain, and the physical storage box is securely transported from his home city to New York City. Tracking information is recorded to the blockchain as the physical storage box is transported from Jonas's home city to the destination, and the location information is updated once it arrives to the new location in New York City. When Jonas arrives to New York City, he arrives to the new location and unlocks the physical storage box using the identity token stored on his mobile device. While Jonas is in New York City, he may wish to increase the level of security required to open the physical storage box, so he elects to assign a coworker a second identity token. For Jonas to gain access to the physical storage device, both Jonas and his coworker may submit their identity tokens within a predetermined period of time in order for the physical storage box to become unlocked. After the work trip, Jonas can remove the coworker's access by issuing instructions to the node to remove the assignment of his physical storage box to his coworker, and the node can update the assignment information in the blockchain.

In another example, Rose has registered her user device to receive access to a physical storage device within system 300. Rose stores work-related documents within her physical storage device. Her supervisor requires access to the work-related document while Rose is on vacation. Accordingly, Rose issues a one-time key to her supervisor's mobile device (e.g., by providing his telephone number to a node 220). Rose's supervisor then using his one-time key to open the physical storage box while Rose is away on vacation. After the supervisor uses his one-time key, it is removed from the blockchain by node 220 and is no longer capable of opening the physical storage box. Alternatively, Rose can remotely unlock her physical storage box by remotely transmitting her identity token to node 220 to unlock the physical storage box for her supervisor without issuing a one-time key.

In some examples, disclosed systems or methods may involve one or more of the following clauses:

Clause 1: A system for providing a secure physical storage system comprising: one or more processors; a non-transitory memory storing instructions that when executed by the one or more processors are configured to cause the system to: receive first registration information from a first user device; assign a first physical storage box of a plurality of physical storage boxes to the first user device and a first identity token associated with the first physical storage box; record assignment information associated with the first physical storage box and the first identity token to a blockchain implemented by the one or more processors; receive the first identity token from the first user device; and transmit instructions to the first physical storage box to transition from a locked state to an unlocked state in response to receiving the first identity token from the first user device.

Clause 2: The system of clause 1, wherein the non-transitory memory includes instructions, that when executed by the one or more processors, causes the system to: receive a request to register a second physical storage box of the plurality of physical storage box from an entity, the request comprising location information and security information; validate the request by comparing the security information to a predetermined security threshold; and record the location information associated with the second physical storage box to the blockchain implemented by the one or more processors.

Clause 3: The system of clause 2, wherein the non-transitory memory includes instructions, that when executed by the one or more processors, causes the system to: receive instructions from the first user device comprising a transfer request to transfer the first physical storage box from a first location to a second location, wherein both the first location and the second location meet or exceed the predetermined security threshold; record the transfer request to the blockchain implemented by the one or more processors; and responsive to the first physical storage box arriving at the second location, record updated location information associated with the first physical storage box to the blockchain implemented by the one or more processors.

Clause 4: The system of clause 1, wherein the non-transitory memory includes instructions, that when executed by the one or more processors, causes the system to: receive access restrictions associated with the first physical storage box from the first user device; and record the access restrictions to the blockchain implemented by the one or more processors.

Clause 5: The system of clause 4, wherein the access restrictions comprise a restriction selected from a time window, a number of unlocks per day, or combinations thereof.

Clause 6: The system of clause 1, wherein the non-transitory memory includes instructions, that when executed by the one or more processors, causes the system to: receive second registration information from the first user device, the second registration information associated with a second user device; assign a second identity token to the second user device, the second identity token associated with the first physical storage box; record the second identity token to the blockchain implemented by the one or more processors; receive the first identity token from the first user device and the second identity token from second user device within a predetermined timeframe; and responsive to receiving the first identity token and the second identity token within the predetermined timeframe, transmit instructions to the first physical storage box to transition from a locked state to an unlocked state.

Clause 7: The system of clause 1, wherein the non-transitory memory includes instructions, that when executed by the one or more processors, causes the system to: receive third registration information from the first user device, the third registration information associated with a third user device; assign a one-time key to the third user device, the one-time key associated with the first physical storage box; record the one-time key to the blockchain implemented by the one or more processors; receive the one-time key from the third user device; responsive to receiving the one-time key, transmit instructions to the first physical storage box to transition from a locked state to an unlocked state; and remove the one-time key assignment from the third user device by updating the blockchain implemented by the one or more processors.

Clause 8: The system of clause 1, wherein the first identity token comprises an access token, an access code, a near-field communication device, or combinations thereof.

Clause 9: A system for providing a secure physical storage system comprising: one or more processors; a non-transitory memory storing instructions that when executed by the one or more processors are configured to cause the system to: receive a request to register a first physical storage box of a plurality of physical storage box from an entity, the request comprising location information and security information; validate the request by comparing the security information to a predetermined security threshold; record the location information associated with the first physical storage box to a blockchain implemented by the one or more processors; receive first registration information from a first user device; assign the first physical storage box to the first user device and a first identity token associated with the first physical storage box; record assignment information associated with the first physical storage box and the first identity token to the blockchain implemented by the one or more processors; receive the first identity token from the first user device; and transmit instructions to the first physical storage box to transition from a locked state to an unlocked state in response to receiving the first identity token from the first user device.

Clause 10: The system of clause 9, wherein the non-transitory memory includes instructions, that when executed by the one or more processors, causes the system to: receive instructions from the first user device comprising a transfer request to transfer the first physical storage box from a first location to a second location, wherein both the first location and the second location meet or exceed the predetermined security threshold; record the transfer request to the blockchain implemented by the one or more processors; and responsive to the first physical storage box arriving at the second location, record updated location information associated with the first physical storage box to the blockchain implemented by the one or more processors.

Clause 11: The system of clause 9, wherein the non-transitory memory includes instructions, that when executed by the one or more processors, causes the system to: receive access restrictions associated with the first physical storage box from the first user device; and record the access restrictions to the blockchain implemented by the one or more processors.

Clause 12: The system of clause 11, wherein the access restrictions comprise a restriction selected from a time window, a number of unlocks per day, or combinations thereof.

Clause 13: The system of clause 9, wherein the non-transitory memory includes instructions, that when executed by the one or more processors, causes the system to: receive second registration information from the first user device, the second registration information associated with a second user device; assign a second identity token to the second user device, the second identity token associated with the first physical storage box; record the second identity token to the blockchain implemented by the one or more processors; receive the first identity token from the first user device and the second identity token from second user device within a predetermined timeframe; and responsive to receiving the first identity token and the second identity token within the predetermined timeframe, transmit instructions to the first physical storage box to transition from a locked state to an unlocked state.

Clause 14: The system of clause 9, wherein the non-transitory memory includes instructions, that when executed by the one or more processors, causes the system to: receive third registration information from the first user device, the third registration information associated with a third user device; assign a one-time key to the third user device, the one-time key associated with the first physical storage box; record the one-time key to the blockchain implemented by the one or more processors; and receive the one-time key from the third user device; responsive to receiving the one-time key, transmit instructions to the first physical storage box to transition from a locked state to an unlocked state; and remove the one-time key assignment from the third user device by updating the blockchain implemented by the one or more processors.

Clause 15: The system of clause 9, wherein the first identity token comprises an access token, an access code, a near-field communication device, or combinations thereof.

Clause 16: A computer implemented method for providing a secure physical storage system, the method comprising: receiving first registration information from a first user device; registering the first user device to have access to a first physical storage box of a plurality of physical storage boxes based on the first registration information; assigning a first identity token to the first user device; recording the registration of the first physical storage box to a first user device and the first identity token to a blockchain; receiving the first identity token from the first user device; and transmitting instructions to the first physical storage box to transition from a locked state to an unlocked state in response to receiving the first identity token from the first user device.

Clause 17: The computer implemented method of clause 16, wherein receiving the first identity token from the first user device further comprises requiring the first user device to be within a predetermined physical proximity to the first physical storage box.

Clause 18: The computer implemented method of clause 16, further comprising: receiving a request to register a second physical storage box of the plurality of physical storage box from an entity, the request comprising location information and security information; validating the request by comparing the security information to a predetermined security threshold; and recording the location information associated with the second physical storage box to the blockchain.

Clause 19: The computer implemented method of clause 18, further comprising: receiving instructions from the first user device comprising a transfer request to transfer the first physical storage box from a first location to a second location, wherein both the first location and the second location meet or exceed the predetermined security threshold; recording the transfer request to the blockchain; and responsive to the first physical storage box arriving at the second location, recording updated location information associated with the first physical storage box to the blockchain.

Clause 20: The computer implemented method of clause 16, further comprising: receiving second registration information from the first user device, the second registration information associated with a second user device; assigning a second identity token to the second user device, the second identity token associated with the first physical storage box; recording the second identity token to the blockchain; receiving the first identity token from the first user device and the second identity token from second user device within a predetermined timeframe; and responsive to receiving the first identity token and the second identity token within the predetermined timeframe, transmitting instructions to the first physical storage box to transition from a locked state to an unlocked state.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for providing a secure physical storage system comprising:
   one or more processors;
   a non-transitory memory storing instructions that when executed by the one or more processors are configured to cause the system to:
      receive a request to register a first physical storage box of a plurality of physical storage boxes from an entity, the request comprising location information and security information;
      validate the request by determining that the security information exceeds a predetermined security threshold;
      receive first registration information from a first user device;
      assign the first physical storage box to the first user device and a first identity token associated with the first physical storage box;
      receive second registration information from the first user device, the second registration information associated with a second user device;
      assign a second identity token to the second user device, the second identity token associated with the first physical storage box;
      receive the first identity token from the first user device and the second identity token from second user device within a predetermined timeframe; and responsive to receiving the first identity token and the second identity token within the predetermined timeframe, transmit instructions to the first physical storage box to transition from a locked state to an unlocked state.

2. The system of claim 1, wherein the non-transitory memory includes instructions, that when executed by the one or more processors, causes the system to:
receive instructions from the first user device comprising a transfer request to transfer the first physical storage box from a first location to a second location, wherein both the first location and the second location meet or exceed the predetermined security threshold; and
responsive to the first physical storage box arriving at the second location, record updated location information associated with the first physical storage box.

3. The system of claim 1, wherein the non-transitory memory includes instructions, that when executed by the one or more processors, causes the system to:
receive access restrictions associated with the first physical storage box from the first user device; and
record the access restrictions.

4. The system of claim 3, wherein the access restrictions comprise a restriction selected from a time window, a number of unlocks per day, or combinations thereof.

5. The system of claim 1, wherein receiving the first identity token from the first user device further comprises requiring the first user device to be within a predetermined physical proximity to the first physical storage box.

6. The system of claim 1, wherein the non-transitory memory includes instructions, that when executed by the one or more processors, causes the system to:
receive third registration information from the first user device, the third registration information associated with a third user device;
assign a one-time key to the third user device, the one-time key associated with the first physical storage box;
record the one-time key to a blockchain implemented by the one or more processors;
receive the one-time key from the third user device;
responsive to receiving the one-time key, transmit instructions to the first physical storage box to transition from a locked state to an unlocked state; and
remove the one-time key assignment from the third user device by updating the blockchain implemented by the one or more processors.

7. The system of claim 1, wherein the first identity token comprises an access token, an access code, a near-field communication device, or combinations thereof.

8. A system for providing a secure physical storage system comprising:
one or more processors;
a non-transitory memory storing instructions that when executed by the one or more processors are configured to cause the system to:
receive first registration information from a first user device;
assign a first physical storage box of a plurality of physical storage boxes to the first user device and a first identity token associated with the first physical storage box;
receive second registration information from the first user device, the second registration information associated with a second user device;
assign a second identity token to the second user device, the second identity token associated with the first physical storage box;
receive the first identity token from the first user device and the second identity token from second user device within a predetermined timeframe; and
responsive to receiving the first identity token and the second identity token within the predetermined timeframe, transmit instructions to the first physical storage box to transition from a locked state to an unlocked state.

9. The system of claim 8, wherein the non-transitory memory includes instructions, that when executed by the one or more processors, causes the system to:
receive a request to register a second physical storage box of the plurality of physical storage boxes from an entity, the request comprising location information and security information;
validate the request by determining the security information exceeds a predetermined security threshold; and
record the location information associated with the second physical storage box.

10. The system of claim 9, wherein the non-transitory memory includes instructions, that when executed by the one or more processors, causes the system to:
receive instructions from the first user device comprising a transfer request to transfer the first physical storage box from a first location to a second location, wherein both the first location and the second location meet or exceed the predetermined security threshold; and
responsive to the first physical storage box arriving at the second location, record updated location information associated with the first physical storage box.

11. The system of claim 8, wherein the non-transitory memory includes instructions, that when executed by the one or more processors, causes the system to:
receive access restrictions associated with the first physical storage box from the first user device; and
record the access restrictions.

12. The system of claim 11, wherein the access restrictions comprise a restriction selected from a time window, a number of unlocks per day, or combinations thereof.

13. The system of claim 8, wherein receiving the first identity token from the first user device further comprises requiring the first user device to be within a predetermined physical proximity to the first physical storage box.

14. The system of claim 8, wherein the non-transitory memory includes instructions, that when executed by the one or more processors, causes the system to:
receive third registration information from the first user device, the third registration information associated with a third user device;
assign a one-time key to the third user device, the one-time key associated with the first physical storage box;
record the one-time key to a blockchain implemented by the one or more processors;
receive the one-time key from the third user device;
responsive to receiving the one-time key, transmit instructions to the first physical storage box to transition from a locked state to an unlocked state; and
remove the one-time key assignment from the third user device by updating the blockchain implemented by the one or more processors.

15. The system of claim 8, wherein the first identity token comprises an access token, an access code, a near-field communication device, or combinations thereof.

16. A computer implemented method for providing a secure physical storage system, the method comprising:
receiving first registration information from a first user device;

registering the first user device to have access to a first physical storage box of a plurality of physical storage boxes based on the first registration information;

assigning a first identity token to the first user device;

storing the registration of the first user device having access to the first physical storage box of the plurality of storage boxes and the assignment of the first identity token to the first user device;

receiving second registration information from the first user device, the second registration information associated with a second user device;

assigning a second identity token to the second user device, the second identity token associated with the first physical storage box;

receiving the first identity token from the first user device and the second identity token from second user device within a predetermined timeframe; and responsive to receiving the first identity token and the second identity token within the predetermined timeframe, transmitting instructions to the first physical storage box to transition from a locked state to an unlocked state.

17. The computer implemented method of claim 16, wherein receiving the first identity token from the first user device further comprises requiring the first user device to be within a predetermined physical proximity to the first physical storage box.

18. The computer implemented method of claim 16, further comprising:

receiving a request to register a second physical storage box of the plurality of physical storage boxes from an entity, the request comprising location information and security information;

validating the request by determining the security information exceeds a predetermined security threshold; and recording the location information associated with the second physical storage box.

19. The computer implemented method of claim 18, further comprising:

receiving instructions from the first user device comprising a transfer request to transfer the first physical storage box from a first location to a second location, wherein both the first location and the second location meet or exceed the predetermined security threshold; and responsive to the first physical storage box arriving at the second location, recording updated location information associated with the first physical storage box.

20. The computer implemented method of claim 16, further comprising:

receiving access restrictions associated with the first physical storage box from the first user device, wherein the access restrictions comprise a restriction selected from a time window, a number of unlocks per day, or combinations thereof; and storing the access restrictions.

* * * * *